United States Patent [19]
Zechnowitz et al.

[11] 3,775,741
[45] Nov. 27, 1973

[54] AIRCRAFT PARKING SYSTEM
[75] Inventors: Alvin L. Zechnowitz; James A. Xenakis, both of Roslyn Harbor, N.Y.
[73] Assignee: Sperry Rand Corporation, New York, N.Y.
[22] Filed: Dec. 22, 1971
[21] Appl. No.: 211,019

Related U.S. Application Data
[62] Division of Ser. No. 81,218, Oct. 16, 1970, Pat. No. 3,662,332.

[52] U.S. Cl............. 340/26, 244/114 R, 250/203 R, 356/153, 356/172
[51] Int. Cl................................................. G08g 5/02
[58] Field of Search.................. 340/22, 23, 24, 25, 340/26, 27 R; 250/199, 203 R; 325/16; 343/16 R, 16 M, 17; 356/152, 153, 172

[56] References Cited
UNITED STATES PATENTS

| | | |
|---|---|---|
| 3,696,248 | 10/1972 | Cunningham et al............... 356/152 |
| 3,690,599 | 9/1972 | Hager................................. 340/26 |
| 3,674,226 | 7/1942 | Wasson............................... 340/26 |
| 3,551,057 | 12/1970 | Hamilton et al.................. 250/203 R |
| 3,599,143 | 8/1971 | Brown et al. ..................... 340/26 |
| 3,591,292 | 7/1971 | Feuchter et al.................. 250/203 R |
| 3,470,377 | 9/1969 | LeFebre et al................... 250/203 R |
| 3,504,182 | 3/1970 | Pizzurro et al.................. 250/203 R |
| 3,435,232 | 3/1969 | Sorensen......................... 250/211 J |

*Primary Examiner*—Kathleen H. Claffy
*Assistant Examiner*—Randall P. Myers
*Attorney*—S. C. Yeaton

[57] ABSTRACT

Apparatus for accurately maneuvering an aircraft on an airport surface to a predetermined parking position involves cooperating optical sensors and guidance display systems for aiding the pilot in controlling motion of the craft. The apparatus aids moving the craft along a preliminary guidance or approach path to intersection of a second guidance path leading the craft precisely to a final stopped position at the parking station.

9 Claims, 12 Drawing Figures

PATENTED NOV 27 1973 3,775,741
SHEET 1 OF 6
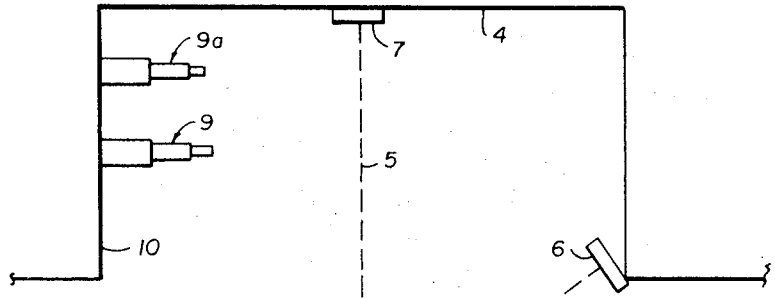
FIG.1
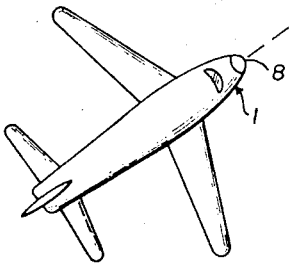
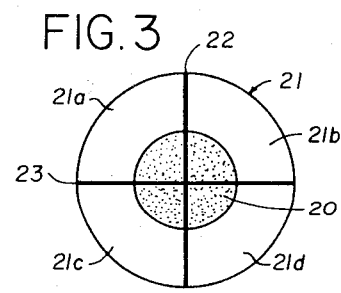
FIG.3
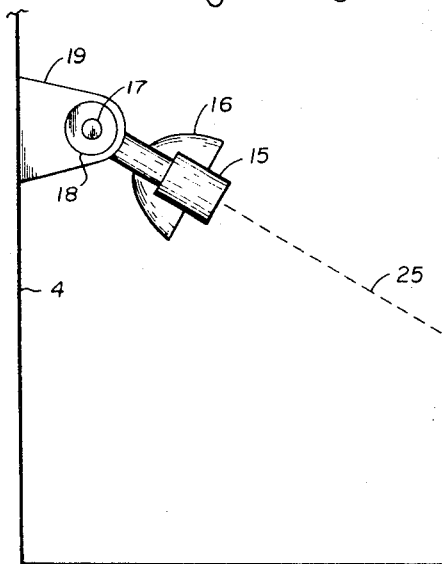
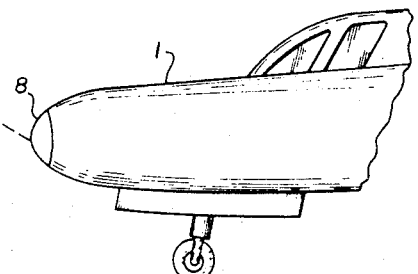
FIG.2

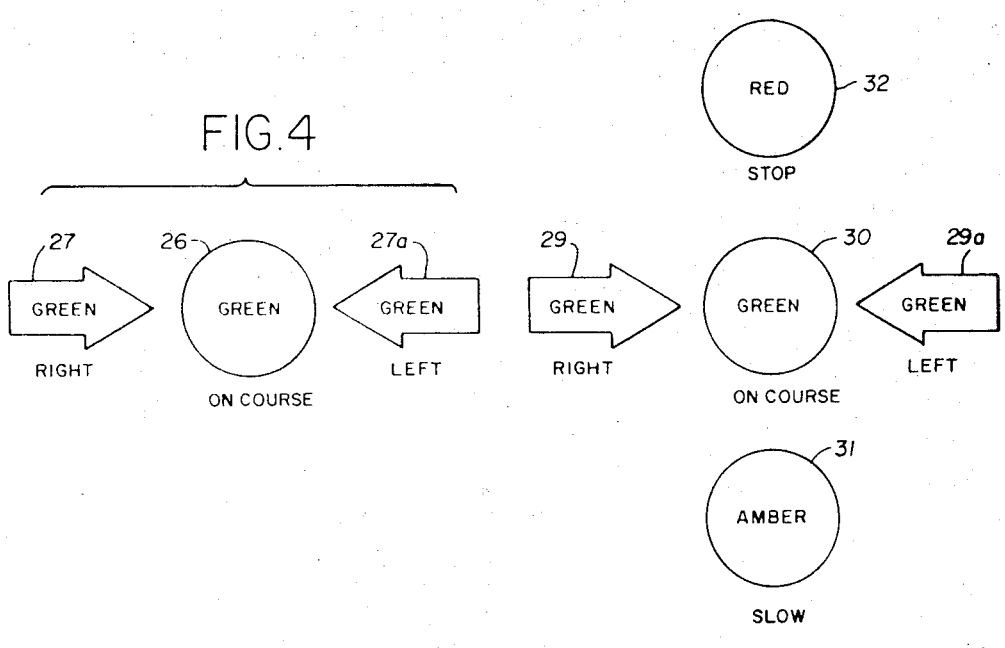
FIG. 4
FIG. 5
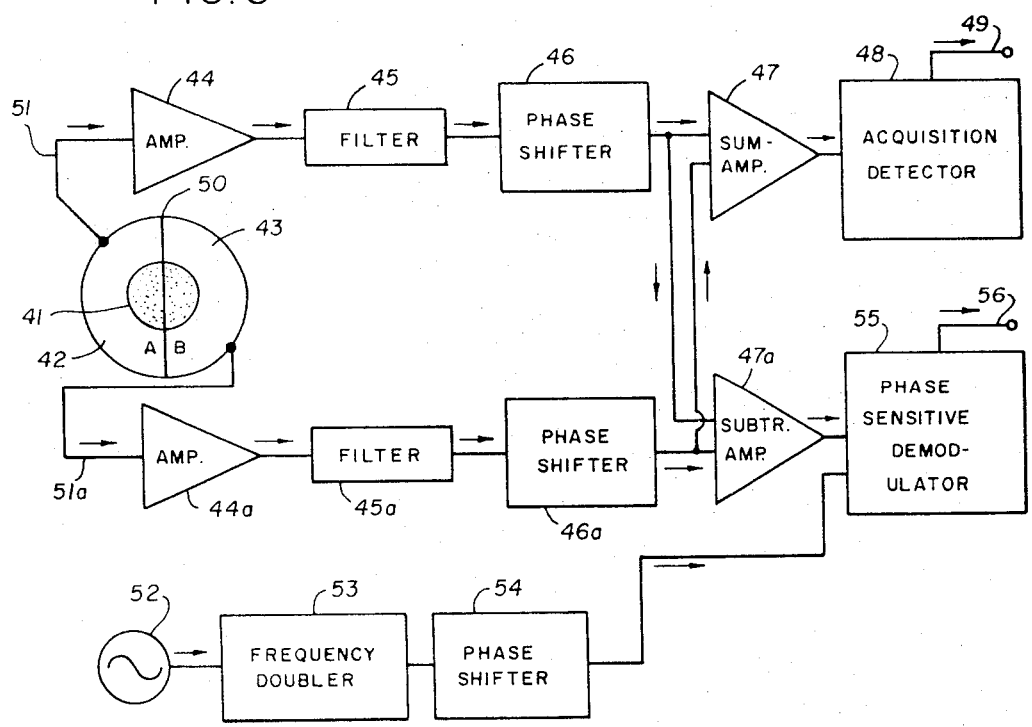
FIG. 6

AIRCRAFT PARKING SYSTEM

CROSS REFERENCE TO RELATED APPLICATION

This is a division of application Ser. No. 81,218, filed Oct. 16, 1970, now U.S. Pat. No. 3,662,332, issued 5-9-72 entitled "Aircraft Parking System," in the names of Alvin L. Zechnowitz and James A. Xenakis.

BACKGROUND OF THE INVENTION

1. Field of the Invention

The invention pertains to means for the accurate guidance of vehicles to a predetermined stopping station and more particularly relates to the terminal guidance of aircraft, after landing, to a precise stopping position designed for passenger or freight transfer.

2. Description of the Prior Art

The considerable complexity of the modern airport, the congestion of aircraft and service vehicles parked or moving on the ground in the airfield zone, and the need for maintaining maximum safety requirements for the protection of passengers, freight, and expensive aircraft have created a demand for improved control over the motion of aircraft on the field. Integrated control of major taxi-ways has been provided so that a central controller selects the route of each landed plane to the area proximate its loading or unloading station. Such centrally controlled systems operate with some effectiveness in moving aircraft quickly off landing ramps so that following aircraft may land unimpeded. Block occupancy control systems employing various sensors, including surveillance of ground vehicles by radar, have been beneficially employed for control of major taxi-ways.

Control of the movement of aircraft in the immediate proximity of the terminal loading position has not been significantly advanced, even though it is in this zone that the major clutter of parked and moving vehicles of all types is normally found, along with various dangerous fixed obstacles which must be avoided by the aircraft.

Customarily, control is exercised in the immediate vicinity of the terminal parking facility through the observation by the pilot of lines and other symbols painted on the airport pavement which may become obscured in bad weather. Such lines may be viewed by the pilot only well ahead of the aircraft. The pilot is sometimes aided by stopping signals located to the right or to the left of the aircraft, but the pilot must look away to one side or the other to observe such signals. In other instances, he must judge the location of the aircraft relative to a probe with an end point suspended to contact the windscreen of the craft in a particular manner. Such prior art devices lack precision, provide little feeling for rate of closure to the pilot, and distract the pilot from viewing what he can of that which is directly ahead of the aircraft.

Use is also made of an airport employee for manually signaling instructions to the pilot during the terminal maneuver. While this employee is on the ground and can therefore observe the exact instantaneous location of the landing wheels of the craft, he must also watch the pilot to be certain that the pilot can always see him and the signals he may make. Further, such signals are subject to easy misinterpretation, do not convey a sense of closure rate, and generally seriously lag in conveying to the pilot information on the real situation of the craft. The cost of this primitive system is extreme, since the services of such an employee are required on a twenty four hour day, seven days per week basis.

SUMMARY OF THE INVENTION

The present invention comprises an all-weather guidance system providing accurate guidance instructions to an aircraft pilot in leaving a tributary taxi-way of the airport and in moving an aircraft toward its terminal parking position with security and precision. Cooperating optical guidance sensors and guidance display apparatus help the pilot to move the craft along an initial approach path, to turn into a final precisely defined path, and accurately to follow that final path, stopping at a specified point on the final path with respect to the terminal building or other location. The guidance and display apparatus is located on the airfield rather than within the aircraft. Further, it is located to be directly in the line of sight of the pilot when he keeps his eyes in the desired direction of forward motion of the aircraft. Dependence upon primitive manual signaling is avoided, as the display system tells the pilot without significant lag what maneuver is required to maintain the desired course in the aircraft.

BRIEF DESCRIPTION OF THE DRAWINGS

FIG. 1 is a representative plan view of the terminal area of an airport showing the locations of elements of the invention.

FIG. 2 is an elevation view corresponding to a portion of FIG. 1.

FIG. 3 is an explanatory illustration for describing the operation of equipment used in FIGS. 1 and 2.

FIG. 4 is a plan view of display symbols used in the invention.

FIG. 5 is a plan view similar to that of FIG. 4.

FIG. 6 is a wiring diagram of a novel optical detector used in the invention.

DESCRIPTION OF THE PREFERRED EMBODIMENTS

Figure 7:
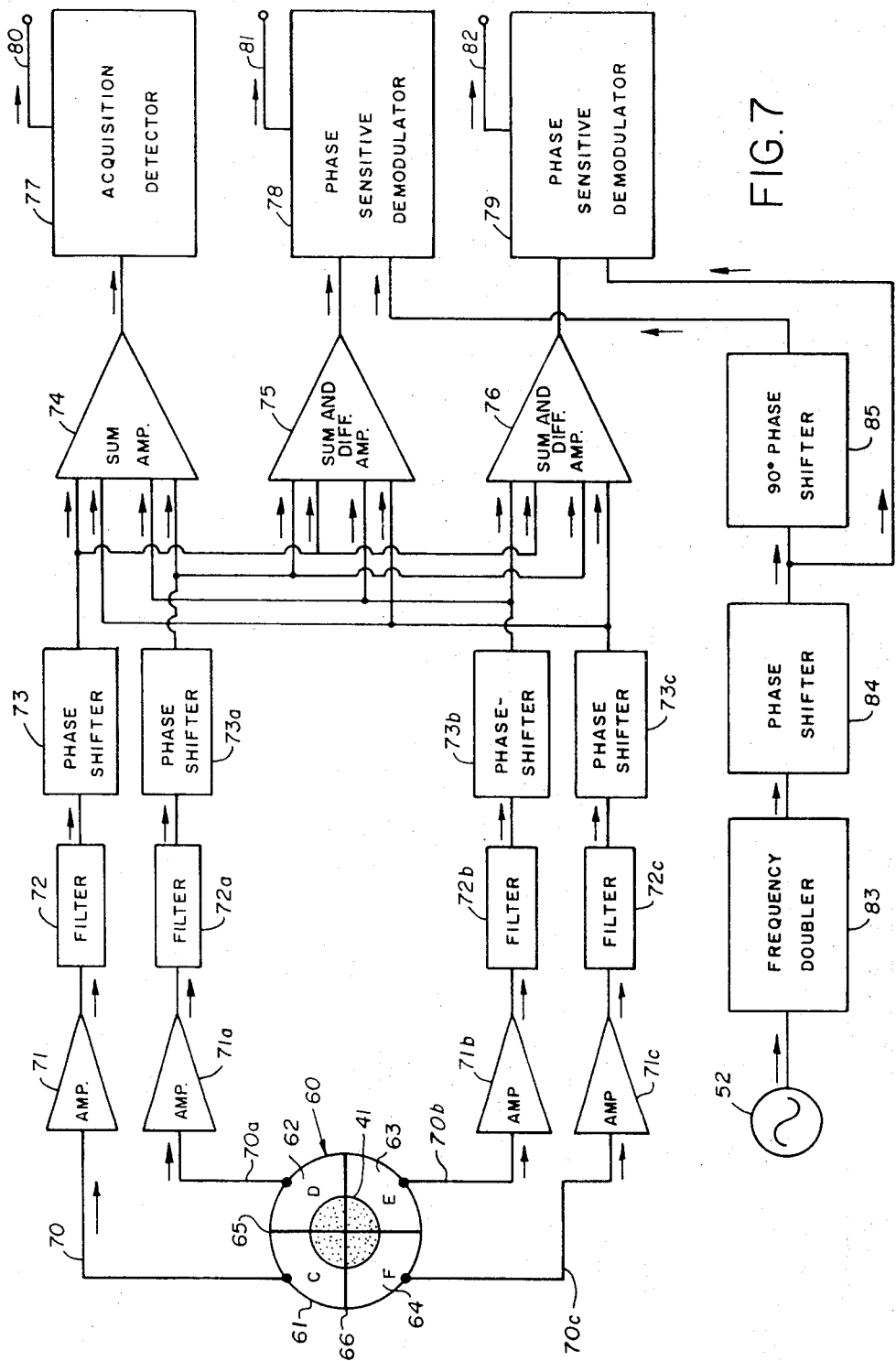
FIG. 7 is a wiring diagram of a circuit alternative to that of FIG. 6.

FIG. 1 illustrates a representative situation faced by a pilot or operator in parking an aircraft or other vehicle at an air line or other terminal and illustrates two modes in which the present invention may be employed for precise maneuvering of the aircraft or vehicle to a selected parking position. A first mode of operation of the novel system will be referred to hereinafter as the coarse mode; it involves aiding the pilot in taxiing or moving the aircraft 1 along a preliminary guidance path indicated in FIG. 1 generally by the dotted line 2. A second mode of operation of the system concerns aiding the pilot in turning the aircraft at a specified point 3 along path 2 so that it makes a final approach toward wall 4 of the air line terminal more precisely along the guidance path generally indicated by the dotted line 5. The invention involves the use of similar optical guidance apparatus at location 6 and at location 7 for cooperation in the respective coarse and fine modes with a light transducing means or optical target 8 affixed to a forward portion, such as the fuselage, of aircraft 1.

Optical target 8 may operate according to several available principles and may be purely passive or active. For example, optical target 8 may simply comprise a circle filled in with a fluorescent paint activatable by electromagnetic energy such as ultraviolet light on an appropriate area on the nose of the aircraft. Fluorescent paints or other materials are readily available, for example, which emit visible or other optical radiation upon exposure to ultraviolet light for activation of radiation detectors. If desired, optical target 8 may be placed on a heated surface so as to avoid degradation of its effectiveness due to any accumulation of snow or ice.

The basic optical guidance sensor apparatus for use at location 6 or at location 7 functions to form a line of sight which may be used in either of two ways. Oriented with its line of sight along either approach path 2 or 5 to the air line terminal, the optical guidance sensor system detects displacement of the light transducing means or optical target 8 mounted on aircraft 1 to the right or to the left of that line of sight when transducer means 8 is appropriately activated. Oriented with its line of sight off-set from one of the approach paths, but intersecting it at some angle less than 90°, the optical guidance system detects the arrival of the aircraft light transducer 8 at a predetermined point along the aircraft approach path.

In operation, it will be seen that the optical guidance sensor at location 6 points toward the optical target 8 on the fuselage of the arriving aircraft 1 along the coarse approach path 2, while a coarse approach guidance indicator, yet to be described and also at location 6, provides guidance indications to the pilot by showing certain visible symbols, as will be explained, to the pilot. Such visual symbols advise the pilot when to make corrective turns relative to approach or guidance path 2, corrections required to cause the optical target 8 and thus aircraft 1 to follow coarse approach path 2. Furthermore, as will also be later described, visible symbols are generated advising the pilot when to start the turn into the final or fine-controlled approach guidance path 5.

During final approach along guidance path 5, the optical guidance apparatus at location 7 points at optical target 8 along path 5. A final line approach guidance indicator at location 7 provides visual symbols for viewing by the pilot, aiding the pilot to make corrective turns for following path 5 with the optical target 8 precisely aligned with path 5 as aircraft 1 continues to move forward toward terminal wall 4. Furthermore, visual symbols are generated by the guidance indicator at location 7, as will be described, advising the pilot to brake the forward motion of aircraft 1 shortly before a predetermined stopping point is reached and advising the pilot also when to bring the aircraft to a complete halt. The desired stopped position of aircraft 1, as determined by the final guidance apparatus, may be, for instance, such that conventional telescoping passenger transfer bridges 9 or 9a projecting from terminal wall 10 will satisfactorily engage the passenger or freight transfer doors of the aircraft 1. Since the stopped position of aircraft 1 is precisely determined by the novel guidance system of location 7, transfer bridges 9 and 9a may have limited motion capability as to extension and to angular position, thereby reducing initial and operating costs of the bridge systems.

The optical guidance sensor apparatus used at locations 6 and 7 may take the general form indicated in FIG. 2; thus, the sensor apparatus is adaptable for employment either for coarse or for fine guidance purposes. With respect to FIG. 2, the optical guidance sensor 15 is seen located on a horizontal shaft, along with a light source 16 for illuminating optical target 8, for angular movement in elevation about shaft 17 by servo motor 18. Shaft 17 is supported within a pair of bearings (not shown) in the respective arms of yoke 19 which, in turn, may be mounted on or adjacent wall 4.

The optical guidance sensor comprises a generally conventional telescope with optical filters for passing a desired band of optical spectra, a detector device to be discussed in further detail, and suitable lenses for focusing an image of optical target 8 on the detector's active surface. As will be seen, the detector is of the generally conventional type having, for instance, four functionally separated equal quadrants, each quadrant being mounted so as to provide independent electrical output current paths, wherein the current level is related to the intensity of illumination of the particular quadrant. As seen in FIG. 3, the telescope system functions in such a manner that the location of the image 20 corresponding to optical target 8 on detector 21 is a direct function of the location of optical target 8 relative to the line of sight of sensor 15.

For example, pairs of quadrants 21a, 21c and 21b, 21d, in FIG. 3. are electrically separated by a vertical gap 22. Therefore, the sum of the outputs of quadrants 21a, 21c, to the left of gap 22 may be compared to the sum of outputs of the right-hand quadrants 21b, 21d, in order to detect left or right displacement of optical target 8 and therefore of aircraft 1 relative to the selected guidance path. In like manner, pairs of quadrants 21a, 21b and 21c, 21d are electrically separated by a horizontal gap 23. Accordingly, the sum of the outputs of quadrants 21a, 21b lying above gap 23 may be compared to the sum of the lower quadrants 21c, 21d in order to detect apparent displacement of optical target 8 above or below the line of sight of the sensor.

The horizontally separated upper and lower respective quadrants 21a, 21b and 21c, 21d may be used in the final approach or fine mode of operation of the apparatus for determining the fact of arrival of the aircraft at a predetermined stopping point on path 5. Such may be accomplished by increasingly depressing the line of sight 25 of detector 15 as indicated in FIG. 2 so that optical target 8 remains always in view of detector 15 until the desired stopped location of aircraft 1 is reached. During approach of aircraft 1 toward wall 4, the error signal developed between the upper and lower respective pairs of quadrants 21a, 21b and 21c, 21d is used to drive servo motor 18 and thus shaft 17 to continue to cause detector 15 to track optical target 8 automatically as aircraft 1 moves forward. As will be seen, a limit switch is provided operated by a cam on shaft 17 which closes at the depression angle for line of sight 25 corresponding to the desired stopped place for aircraft 1.

The guidance sensor system, as previously noted, provides a guidance display of certain symbols for instruction of the pilot. For example, FIG. 4 shows the display for the coarse or approach indicating system found at location 6 of FIG. 1. If the aircraft 1 is accurately following coarse approach path 2, the green circular light 26 is illuminated. If the aircraft 1 deviates to the left excessively, a symbol 27 in the form of a green arrow is illuminated instead of circular light 26, directing the pilot to turn the aircraft to the right until the green arrow 27 is extinguished and the circular green light 26 is again lit. Conversely, when green arrow 27a is illuminated when circular green light 26 goes out, the pilot is being instructed to turn the aircraft to the left to correct for excessive right-ward deviation of the craft from guidance path 2.

As the movement of aircraft 1 along the coarse guidance path 2 continues, aircraft 1 reaches a point 3 at which the craft is to turn so as to be subject to fine control by an optical guidance sensor at 7 on wall 4, the left-turn-commanding green arrow 27a is caused to blink, instructing the pilot to turn the craft from guidance path 2 into path 5. Aircraft 1 continues to turn counterclockwise until sensor 7 on wall 4 views optical target 8 and takes over the guidance control of aircraft 1.

At the time when optical guidance sensor 7 takes over control, the pilot follows directions presented to him by a visual guidance display at location 7 of FIG. 1. The display seen by the pilot under the latter circumstances is seen in FIG. 5. While aircraft 1 is still rotating from path 2 to path 5, the pilot will normally see the green arrow 29a illuminated, indicating that a continued left turn is required to achieve alignment with path 5. Rotation continues until the arrow 29a extinguishes and the central circular green light 30 is illuminated.

Having completed the turn into guidance path 5, the pilot moves the aircraft 1 forward toward wall 4, holding it on the selected path 5 by reference to the state of illumination of green arrows 29, 29a and the central light 30. If the aircraft deviates excessively to the left, green arrow 29 is illuminated and circular green light 30 goes off, commanding the pilot to turn the aircraft to the right until arrow 27 is extinguished and the circular green light is again lit. Conversely, when arrow 29a is lit and circular green light 30 is out, the pilot reacts by turning aircraft 1 to the left to correct for excessive deviation to the right of path 5.

As aircraft 1 progresses along the final approach path 5 and at a predetermined distance from the aircraft stop point, say 15 or 20 feet from the stop point, the circular amber light 31 is illuminated, directing the pilot to brake the aircraft's forward motion. Upon arrival at the predetermined stop point, the amber light 31 is turned off and the circular red light 32 is illuminated, commanding a complete stop.

In presenting the general discussion of the guidance sensors used at locations 6 and 7, a four-quadrant detector element was considered in order to afford a general understanding of the operation of the invention. In designing systems for particular requirements, four quadrant as well as other position error sensors may be beneficially employed. Therefore, to illustrate the versatility of the novel system, two types of sensors will now be described in further detail. For example, FIG. 6 illustrates a dual-section detector system which may be used according to the invention to provide an acquisition signal and a left-right error signal or an acquisition signal and an up-down error signal.

Referring still to FIG. 6, the active detector elements 42, 43 are half circular and are separated by a vertical gap 50 where the detector is used to develop a left-right error signal. For purposes of general illustration, the image 41 of optical target 8 is shown centrally focussed on the split surfaces 42, 43 of detector 40. As in conventional practice, the active surfaces of detector halves 42, 43 comprise photosensitive material capable of generating electrical currents whose individual amplitudes are proportional to the amount of light focussed on the individual halves.

A preferred form for the light source 16 of FIG. 2 is a conventional ultraviolet lamp powered, for example, from an alternating current electrical power source. Because of a wellknown characteristic of such ultraviolet lamps, the optical target on aircraft 1 will be illuminated by ultraviolet light pulses occurring once each half cycle of the voltage applied to the lamp. For example, if the lamp is driven by a 60 cycle per second power source, the illumination intensity from lamp 16 varies at a 120 cycle per second rate. Accordingly, the electrical signals generated by the detector elements or halves 42, 43 vary at a 120 cycle per second rate. Such a factor is beneficial to the operation of the detector, since ambient 60 cycle per second fields do not degrade operation of the device. When the image 41 of optical target 8 lies equally on halves 42, 43 of detector 40, equal double frequency currents flow into the respective conductors 51, 51a. When the image 41 lies entirely upon one or the other of halves 42, 43, the output of that half section is saturated and the output of the opposed half section is substantially zero. Between such situations, proportionally different currents flow into conductors 51, 51a.

Conductor 51 leads through a series circuit comprising preamplifier 44, the double-frequency (120 cycle per second pass) filter 45, and adjustable phase shifter 46. Likewise the currents flowing in conductor 51a are lead to a series circuit comprising preamplifier 44a, double frequency filter 45a, and adjustable phase shifter 46a. Filters 45, 45a serve to remove direct current flow due to the presence of ambient relatively constant light levels adjacent the sensor and to minimize the adverse effects of other noise signals. Phase shifters 46, 46a are circuit trimming devices permitting later accurate combination and comparison of the signals on leads 51, 51a without the disturbing effects of differential phase shifts which may be spuriously injected into the circuit, especially by filters 45, 45a.

The outputs of phase shifters 46, 46a are both supplied to summation amplifier 47 and the sum is applied to acquisition detector circuit 48. Detector circuit 48 may contain a suitable conventional threshold circuit so that an output signal is passed to lead 49 only when the sum signal from summation amplifier 47 is greater than a predetermined value. It will be understood that the output of acquisition detector circuit 48 takes a step to a significant value when indicating that the image 41 of optical target 8 has come into the field of view of detector 40 and has therefore been acquired by it.

Secondly, the outputs of phase shifters 46, 46a are applied in subtractive manner to amplifier 47a in order to develop a positional error signal (a left-right error signal in the case being presented in FIG. 6), representing deviation of the optical target 8 with respect to a selected path. Where E depicts the amplitude of the error signal and A and B represent the amplitudes of the respective currents from half-sectors 42, 43, the signal E is represented by the value of (A-B). The error signal E thus generated at the output of amplifier 47a is a double-frequency (120 cycles per second) signal whose phase depends on the polarity or sense of the left-right positional error and whose magnitude is proportional to the amplitude of deviation from the selected path. The frequency-doubled output of amplifier 47a is supplied to phase sensing detector or demodulator 55 along with a reference signal. The latter is derived in frequency doubler 53 from the signal from alternating power source 52, which is the same power source as drives ultraviolet light source 16. Phase shifter 54 functions in the same manner as phase shifters 46, 46a. The function of phase sensing demodulator 55 is to provide on output lead 56 a unidirectional signal whose amplitude is proportional to the amplitude of displacement of target image 41 with respect to gap 50 and whose positive or negative sense represents the direction or sense of such undesired displacement.

FIG. 7 illustrates a four-quadrant detector system embodying generally the same principles as were employed in the dual sector detector of FIG. 6. In the detector 60 of FIG. 7, four separated quadrants 61, 62, 63, and 64 provide outputs requiring processing for the generation of the acquisition signal, of a left-right error signal, and of an up-down error signal. The image 41 of the optical target 8 is focussed on detector 60 so that, for no left-right or up-down positional error of optical target 8, the image 41 is centered at the intersection of vertical gap 65 with horizontal gap 66, gaps 65 and 66 providing the desired isolation of the respective detector plates 61, 62, 63, and 64.

The electrical outputs of the respective detector plates or quadrants 61, 62, 63, and 64 are individually supplied via leads 70, 70a, 70b, and 70c to respective preamplifiers 71, 71a 71b, and 71c and then pass through respective filters 72, 72a, 72b, and 72c. The filters again serve the purpose discussed in connection with filters 45 and 45a of FIG. 6. The outputs of filters 72, 72a, 72b, and 72c are then subjected to the action of respective variable phase shifters 73,73a,73b,and 73c. These several phase shifters are for trimming purposes and are used in the conventional manner, being normally adjusted only at the time of installation of the system.

Each of the outputs of the four above-described channels is supplied to summation amplifier 74 and after amplification are fed as a single signal to acquisition detector 77. Amplifier 74 and acquisition detector circuit 77 are analogous to summation amplifier 47 and acquisition detector circuit 48 of FIG. 6 with the exception that signals from four channels are summed to supply the acquisition signal on lead 80, rather than only two. The four signals from phase shifters 73, 73a, 73b, and 73c are also summed and compared in pairs in summing amplifiers 75 and 76 for generating output signals on leads 81 and 82.

Let $E_{LR}$ represent the to-be-derived left-right error signal and $E_{UD}$ the up-down error signal; also, let C,D,E, and F represent respective variable amplitude outputs from quadrant plates 61,62,63, and 64 of detector 60. The objective of summing and comparing (in pairs) of the signals C,D,E, and F is to develop the error voltages $E_{LR}$ and $E_{UD}$. Accordingly:

$$E_{LR} = (C + F) - (D + E)$$

and $$E_{UD} = (C + D) - (F + E).$$

The double frequency error signals $E_{LR}$ and $E_{UD}$ are phase compared to a double frequency reference signal in the respective phase sensing demodulators 78 and 79 to develop unidirectional error signals. For this purpose, power source 52 supplies energy to frequency doubler 83 which passes directly through trimmer phase shifter 84 to one of the two inputs of phase sensing demodulator 79. The output of the latter appearing on lead 82 is a bipolar, variable amplitude signal representing up-down error. The double frequency output of circuit 84 is passed through a 90° phase shifter 85 for supplying a quadrature reference voltage to phase sensitive demodulator 78. The output of the latter appearing on lead 81 is a second bipolar, variable amplitude signal representing left-right error.

Figure 8:
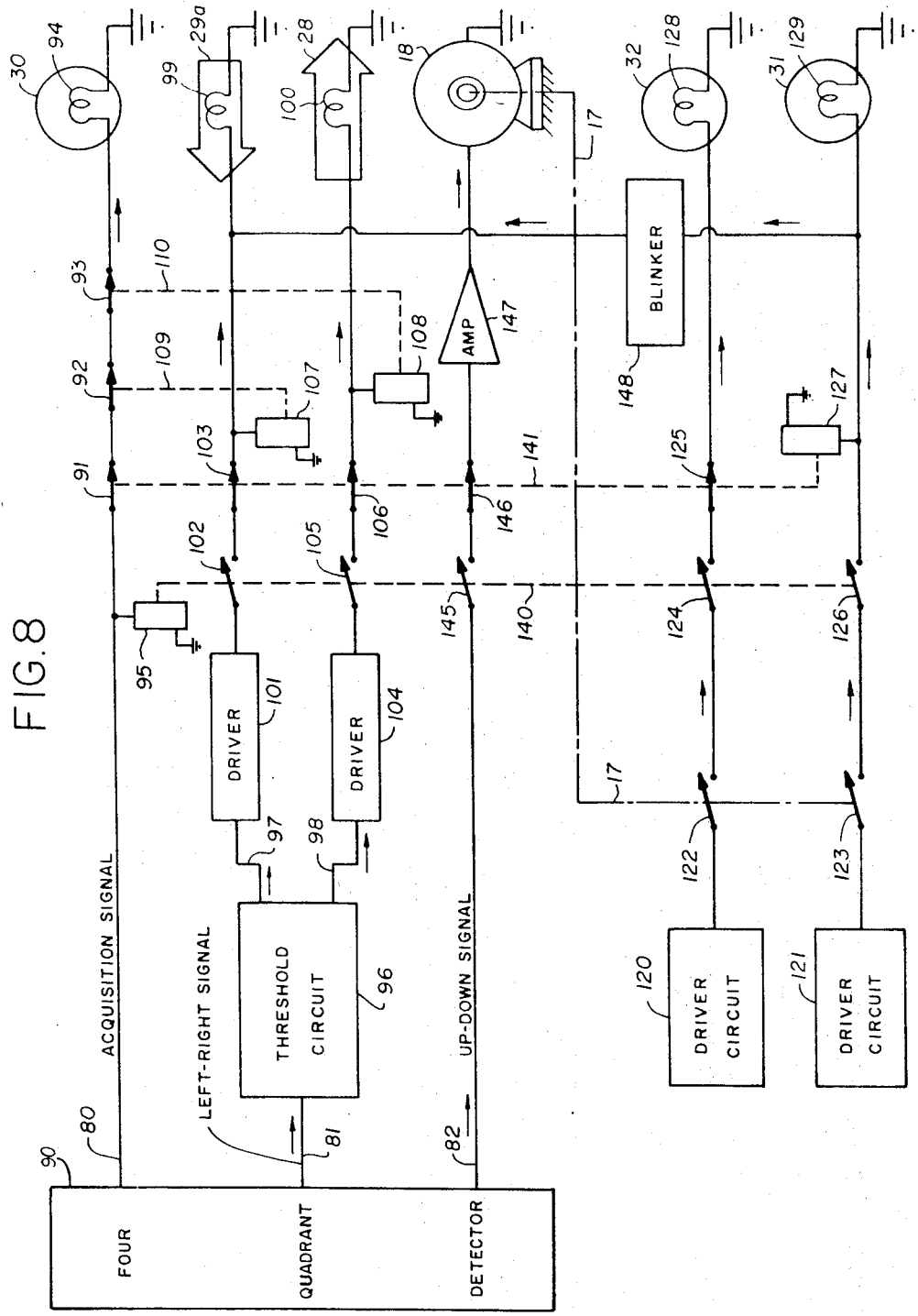
FIG. 8 is a wiring diagram of display equipment for providing the displays of FIGS. 4 and 5.

FIG. 8 illustrates apparatus amploying, for example, the detector system of FIG. 7 for driving the guidance display system of FIG. 5. The apparatus to be discussed with reference to FIG. 8 is adapted to be used either for coarse or for fine guidance and may be placed, for example, at either or both locations 6 and 7 of FIG. 1. In FIG. 8, the four-quadrant detector system of FIG. 7 is illustrated at 90 with its three output leads 80, 81, and 82. The acquisition signal on lead 80 is supplied through relay switching contacts 91, 92, and 93 to the light source 94 of the green light 30 of FIG. 5 and also through relay solenoid 95 to ground.

The left-right signal on lead 81 is coupled to a threshold circuit 96 and thence through parallel circuits 97 and 98 to the respective light sources 99 and 100 of the respective green arrow symbols 29a and 29 of FIG. 5. Circuit 97 includes driver circuit 101 and relay switching contacts 102 and 103. Between relay contact 103 and light source 99, circuit 97 is connected to ground through relay solenoid 107. Similarly circuit 98 includes driver circuit 104 and relay switching contacts 105 and 106. Between relay contact 106 and light source 100, circuit 98 is connected to ground through relay solenoid 108. Relay solenoid 107 provides actuation of relay contacts 92 through the agency of mechanical linkage 109. Likewise, relay solenoid 108 provides actuation of relay contacts 93 through mechanical inkage 110. The up-down signal on lead 82 is coupled through relay contacts 145 and 146 and power amplifier 147 to positional servo motor 18 of FIG. 2 for driving shaft 17 which controls the position of optical guidance sensor 15 of FIG. 2 and the cam activation of switches 122 and 123.

Driver circuit 120 is coupled through switch 122 and relay contacts 124 and 125 to the light source 128 of the circular amber light 32 of FIG. 5. Likewise, driver circuit 121 is connected through switch 123 and relay contact 126 to the light source 129 of the circular red light 31 of FIG. 5. Between relay switch contact 126 and light source 129, there is a connection through relay solenoid 127 to ground. Relay solenoid 95 coupled to lead 80 is equipped with a mechanical linkage 140 for actuation of the several relay contacts 102,105,145,124,and 126. Likewise, relay solenoid 127 associated with driver circuit 121 is provided with a mechanical linkage 141 for operation of the several relay contacts 91, 103, 106, 146, and 125.

In operation, an acquisition signal appearing on lead 80 causes relay solenoid 95 to operate linkage 140 so as to close normally open relay contacts 102, 105, 145, 124, and 126 so that signals are present at the outputs of the relay switches. In addition, the acquisition signal passes through the normally closed relay switch contacts 91, 92 and 93 to illuminate light source 26 of the on course green lamp 30 of FIG. 5.

Any bipolar signal on lead 81 representing a left-right error enters the polarity detector and threshold circuit 96 which provides no output to circuit 97 or 98 if the left-right error signal is below a predetermined value. If the error signal on lead 81 is positive and greater than the threshold level (representing a right-ward position error of the aircraft), a voltage is delivered to driver circuit 101. Driver 101 is a conventional driver circuit using amplification or other means to provide power at suitable levels for operation of relay solenoids and of light sources such as tungsten incandescent lamps. The output of driver 101 passes through closed relay contacts 101 and 103 to relay solenoid 107. Since this event represents the existence of a right-ward positional error, solenoid 107 operates linkage 109 and opens relay switching contacts 92, thus extinguishing light source 94. At the same time, the signal from driver 101 illuminates light source 99 of the green left-pointing arrow symbol 29a. In a like manner, if a negative error greater than the predetermined threshold value is applied to the polarity detector and threshold circuit 96, it yields no output to circuit 97, but instead delivers its output to circuit 98 and accordingly to a second driver circuit 104 which is similar in nature to driver circuit 101. The output of driver 104 then passes through the closed relay switching contacts 105 and 106 to activate light source 100 associated with the green right-pointing arrow symbol 29 of FIG. 5. The same signal in passing through relay solenoid 108 moves linkage 110 and opens relay switch contact 93, again extinguishing the green on-course light 30 of FIG. 5.

As previously noted, the up-down error signal from output lead 82 of the four quadrant detector 90 is used for a distinctive purpose; namely to drive servo motor 18 and thus to position optical sensor 15 of FIG. 2 in elevation angle so as to track the moving aircraft 1. The up-down error signal is applied through the closed relay switching contacts 145 and 146 to power amplifier 147 and thence to servo motor 18. Shaft 17 in addition to being mechanically arranged to move optical sensor 15, is extended so that it controls the opening or closing of cam switches 122 and 123.

Thus, servo motor 18 is adapted to drive shaft 17 on which the detector 60 of FIG. 7 is mounted, thereby causing detector 60 to track the line of sight of the moving optical target 8. Continued rotation of shaft 17 activates switches 122 and 123 in relatively close succession at prescribed distances of the optical target 8 and thus of aircraft 1 from the terminal wall 4, for example.

When the system of FIG. 8 is used at location 6 to control motion of aircraft 1 along the coarse guidance path 2, the circuit elements 120, 122, 124, 125, 128 and 129 are not used, but relay contacts 123 then close to permit actuation of a blinker circuit 148 of conventional nature which passes pulses of electrical current to the light source 99 of left-ward directed arrow 29a for instructing the pilot to turn the aircraft into path 5 of FIG. 1. The output from driver 121 also causes relay solenoid 127 to open relay switching contacts 91, 103, 106, 146, and 125 so as to inhibit operation of light sources 94, 99, 100, and 128 from normal operation and to end rotation of motor 18, thus stopping its tracking mode of operation.

On the other hand, when the system of FIG. 8 is used at location 7 to control the approach of aircraft 1 along the fine guidance path 5, all circuit elements of FIG. 8 are used except for the connection involving blinker 148. The output of driver circuit 121 is used to illuminate light source 129 of the red stop light 31 at the time rotation of shaft 17 causes switch 123 to close. The switch 122 connects driver circuit 120 through relay switch contacts 124, 125 to illuminate amber light 32 as a signal to the pilot to brake the aircraft's forward motion before the stop point is reached and red light 129 is illuminated. Thus, switch 122 causes amber light source 128 to be illuminated 10 to 20 feet before the craft reaches its stopping position, whereupon continued rotation of shaft 17 causes amber light source 128 to go off, and the shaft cam system actuates switch 123, causing red light source 129 to be illuminated.

Once aircraft 1 is precisely parked, for example, the system may be returned to its original position for recycling in preparation for the arrival of a further aircraft manually or automatically. For example, a timer activated by the current supplied to red light 31 may be used simply to supply after a delay a voltage elevating optical sensor 15 to its original maximum elevation. Other means for recycling the system will be apparent to those skilled in the art.

Figure 9:
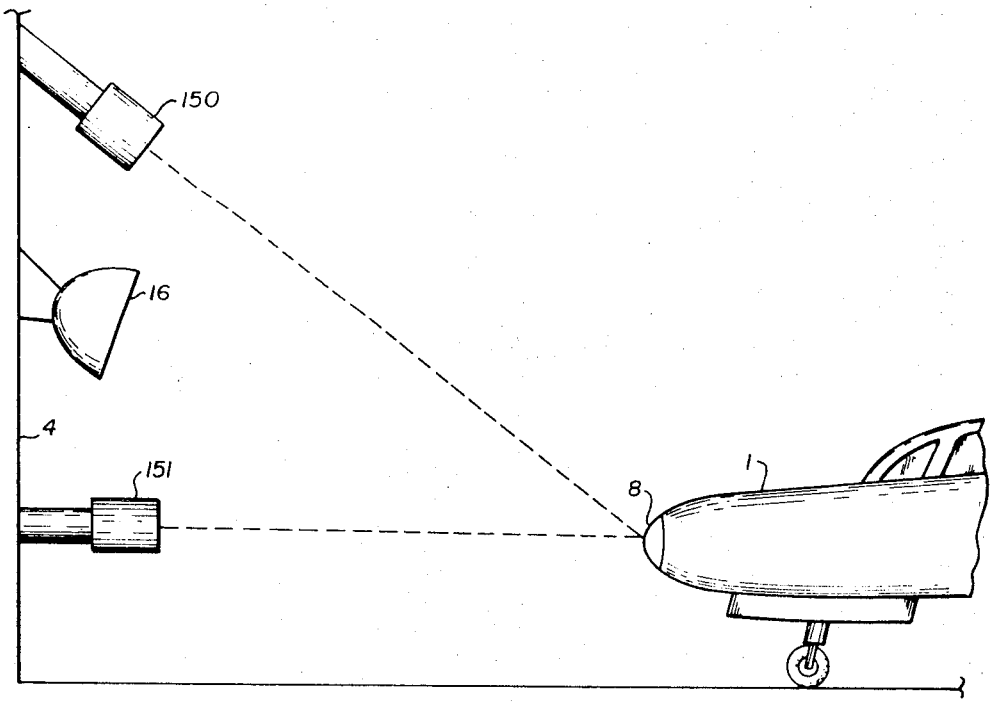
FIG. 9 is an elevation view, similar to that of FIG. 2, showing locations of novel equipment representing an alternative form of the invention.

In order further to illustrate the versatility of the invention, a novel alternative to the arrangement of FIG. 2 will be discussed with reference to FIGS. 9 to 12. Referring particularly to FIG. 9, there is illustrated an optical guidance and sensing system which can also be used to determine motion of the aircraft along the guidance paths 2 and 5 of FIG. 1. By way of simplification, the arrangement of FIG. 9 uses a pair of fixed optical guidance sensor systems 150 and 151 affixed to a wall 4, neither of which automatically tracks the approaching optical target 8. Again, each of sensor systems 150 and 151 comprises any necessary optical filters and a focussing lens system, but each uses a dual section detector of the type discussed in connection with the dual section detector circuit of FIG. 6. The ultraviolet lamp 16 mounted on wall 4 has a relatively broad illumination pattern for illuminating the fluorescent optical target for an extended range of positions of aircraft 1 along path 2 or along path 5.

Figure 11:
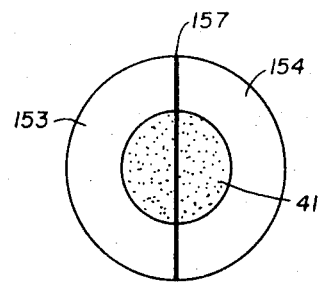

Sensor system 151 is mounted from wall 4 to look out substantially horizontally along its line of sight to the optical target 8. Thus, target 8 is always in view by sensor system 151 unless highly abnormal departure of the aircraft from the selected path obtains. As seen in FIG. 11, the optical detector of sensor 151 is supplied with dual half plates 153 and 154 separated by a vertical gap 157 and is thus of the type affording left-right sensing of an image 41 of the optical target 8.

Figure 10:
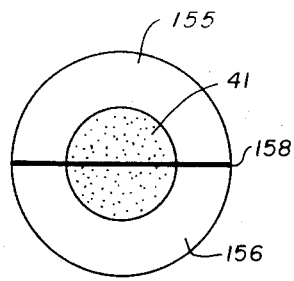
FIGS. 10 and 11 are explanatory illustrations for describing operation of equipment used in FIG. 9.

Sensor system 150 is mounted from wall 4 to look downward at a significant angle toward the selected guidance path with its line of sight depressed toward the desired location of optical target 8 substantially at the stopped position of aircraft 1. Thus, target 8 is seen by optical sensor system 150 in the general vicinity of the point at which aircraft 1 is to stop. As seen in FIG. 10, the detector of sensor 150 is supplied with dual half plates 155 and 156 separated by a horizontal gap 158 and is thus of the type which would normally supply up-down sensing of optical target 8. It is to be understood that the line of sight of sensor system 150 intersects the line of sight of sensor 151 in the fine control system at the desired stopped position of the aircraft. During the final approach, the amber slow signal 31 is actuated when target acquisition occurs and the stop signal 32 is lit when image 41 is centered between plates 155, 156. It is further to be understood that the system of FIG. 9 may be used during the coarse guidance regime; under such a circumstance, the line of sight of sensor 150 intersects the line of sight of sensor 151 substantially at the point along guidance path 2 at which the pilot is to be signalled by a blinking arrow light to turn the aircraft into path 5 for final approach.

Figure 12:
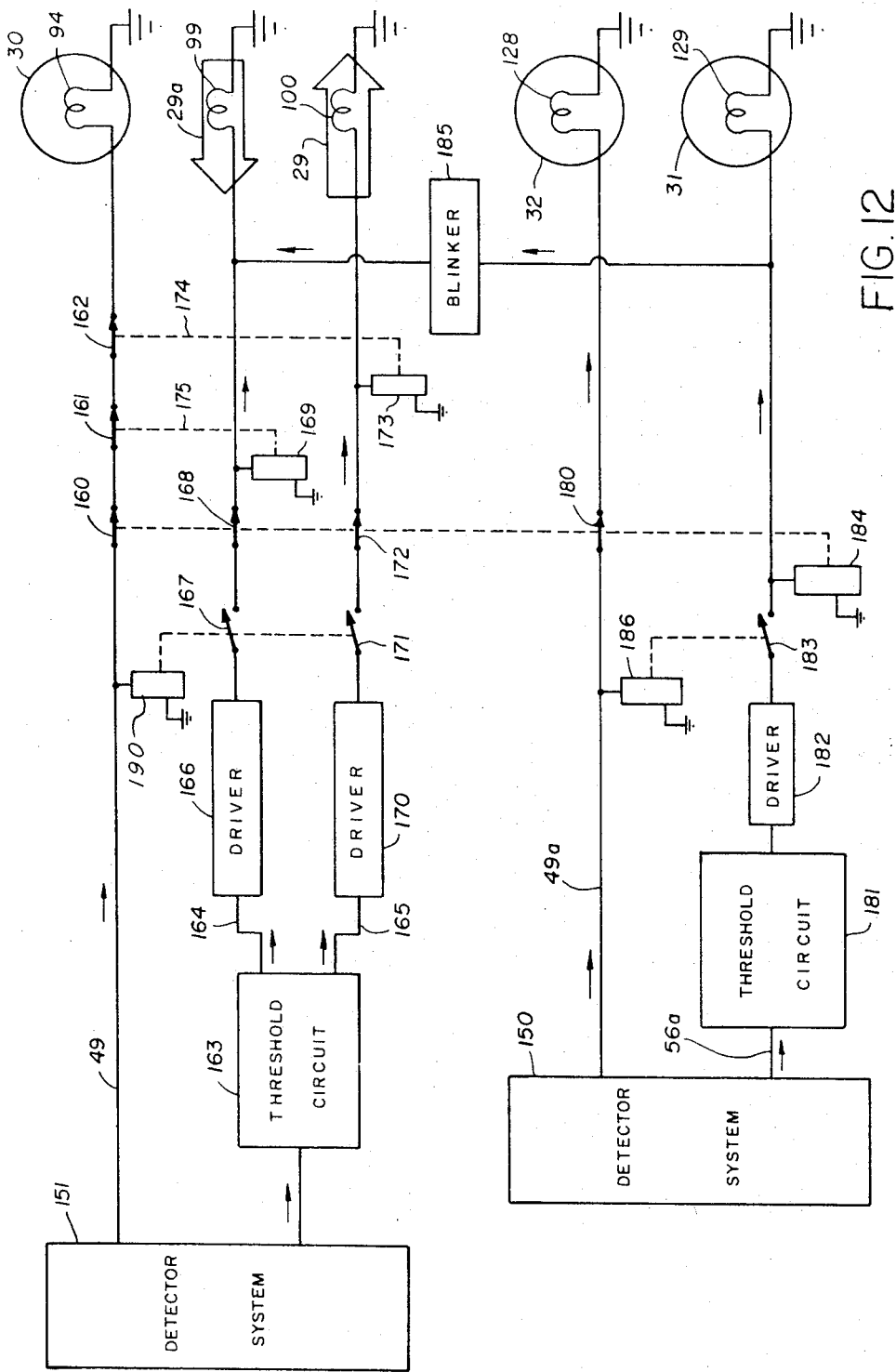
FIG. 12 is a wiring diagram of a circuit alternative to that of FIG. 8.

An arrangement analogous to that of FIG. 8 but for operation in the system of FIG. 9 is illustrated in FIG. 12. It employs an optical sensor system 151 like that of FIG. 6 for provision of a first acquisition signal and a left-right error signal on the respective output leads 49 and 56. Similarly, it employs a second optical sensor system 150 again like that of FIG. 6 but rotated 90° from sensor 151 for provision of a second acquisition signal and an up-down error signal on the respective output leads 49a and 56a. The same set of light sources 94, 99, 100, 128, and 129 is used as in the system of FIG. 12 and the same set of respective illuminatable display symbols 29, 29a, 30, 31, and 32 is employed.

The lead 49 acquisition signal is connected to ground through relay solenoid 190 and the normally closed relay switch contacts 160, 161, and 162 to the light source 94 of green circular display 30. The left-right signal on lead 56 is connected to a threshold circuit 163 and thence through parallel circuits 164 and 165 to the respective light sources 99 and 100 of the respective green arrow symbols 29a and 29. Circuit 164 includes driver circuit 166 and relay switching contacts 167 and 168. Between relay contact 168 and light source 99, circuit 164 is connected to ground through relay solenoid 169. Similarly, circuit 165 includes driver circuit 170 and the relay switching contacts 171 and 172. Between relay contact 172 and light source 100, circuit 165 is connected to ground through relay solenoid 173. Relay solenoid 169 provides actuation of relay contact 161 through the agency of mechanical linkage 175. Likewise, relay solenoid 173 provides actuation of relay contact 162 through operation of mechanical linkage 174.

The lead 49a acquisition signal is supplied directly through relay switch contact 180 to the light source 128 of amber slow signal 32. The lead 56a up-down signal is applied to threshold circuit 181, whose output is connected to driver circuit 182. When relay switch contact 183 is closed, the output of driver 182 illuminates the red signal lamp 129 of indicator 31. The same output passes through relay solenoid 184 to ground.

In the operation of the alternative system of FIG. 12, an acquisition signal present on lead 49 causes light source 94 to illuminate green signal 30 and also energizes relay solenoid 190 to cause relay contacts 167, 171 to close. The left-right error signal on lead 56 from optical sensor system 151 is used in threshold circuit 163 to cause driver circuits 166, 170 to illuminate a light source 99 or light source 100 where a left or a right error exceeds the threshold level of circuit 163. In this operation, circuits 163, 166, and 170 operate in the manner described previously in connection with threshold circuit 96 of FIG. 8 and its associated driver circuit 101, 104 and the light sources 99, 100 of FIG. 8. Relay solenoids 169 and 173 inhibit illumination of light source 94 when a significant left or right error is present by opening relay switch contacts 161 and 162.

The second acquisition signal, appearing on output lead 49a of sensor system 150, is used to energize the relay solenoid 186, which event closes relay switch contact 183, permitting the up-down error signal to be used. During final approach of the aircraft, the acquisition signal on lead 49a is used to illuminate light source 128 of the amber symbol 32 just as the aircraft approaches its stopping point.

During the final approach mode along guidance path 5, the acquisition signal on lead 49a causes light source 128 to go on. The up-down error signal on lead 56a acts through threshold circuit 181 and driver circuit 182 when the target image 41 is centered on the dual plates of detector 150 to energize relay solenoid 184. Such an event opens relay switch contact 160,168,172, and 180 to inhibit the other display light sources 94, 99, 100 and 128.

On the other hand, in the coarse mode of operation along guidance path 2, light source 129 is not used. The output of driver 182 is used instead to actuate a conventional blinker device 185 in the coarse mode, causing it to blink the correction arrow symbol 29a, indicating to the pilot that a turn should be executed from coarse guidance path 2 to fine path 5. In the apparatus for the final traverse of path 5, the blinker 185 is not used, but the output of driver 182 is applied directly to cause light source 129 to illuminate the red stop lamp 31 when the aircraft has reached its desired stopped position.

It is seen that the invention is a flexible and reliable means for guidance of an aircraft or other vehicle moving toward a terminal parking station. The guidance system aids the operator or pilot in making accurate maneuvers to move the craft along an initial path, to turn it precisely into a final guidance path, and to stop the craft accurately at a predetermined load transfer or other location. The invention adds no additional active apparatus to the aircraft and provides a command display which is seen by the operator or pilot without distracting his view forward along the path to be taken by the craft. The use of error prone manual signalling is entirely avoided, and the maneuvers executed by the craft or vehicle are entirely determined by the craft pilot without intervention of other personnel.

While the invention has been described in its preferred embodiment, it is to be understood that the words which have been used are words of description rather than of limitation and that changes within the purview of the appended claims may be made without departure from the true scope and spirit of the invention in its broader aspects.

We claim:

1. Apparatus for providing guidance indications to the operator of a vehicle with respect to a predetermined path comprising:
   alternating potential supply means supplying a potential of a predetermined frequency,
   optically fluorescent surface means adapted to be mounted on said vehicle,
   ultraviolet light source means activated by said potential of said predetermined frequency illuminating said optically fluorescent surface means at twice said predetermined frequency for exciting said optically fluorescent surface means to produce at twice said predetermined frequency impulses of fluorescent optical radiation, said ultraviolet light source means being located adjacent an end of said predetermined path, photosensitive detector means adjacent said end of said predetermined path having first and second electrode means responsive to said fluorescent optical radiation for providing respective first and second output signals of twice said predetermined frequency.

sum circuit means for generating a summation of said first and second output signals, threshold detector means responsive to said sum circuit means for forming an output only when said summation exceeds a predetermined magnitude, and display means adjacent said end of said predetermined path responsive to said threshold detector means for indicating to said operator when said optically fluorescent surface means is substantially located over said predetermined path.

2. Apparatus as described in claim 1 further including filter means for passing signals substantially only of twice said predetermined frequency from said respective first and second electrode means to said sum circuit means.

3. Apparatus for providing guidance indications to the operator of a vehicle with respect to a predetermined path comprising:

alternating potential supply means supplying a potential of a predetermined frequency, optically fluorescent surface means adapted to be mounted on said vehicle, ultraviolet light source means activated by said potential of said predetermined frequency illuminating said optically fluorescent surface means at twice said predetermined frequency for exciting said optically fluorescent surface means to produce at twice said predetermined frequency impulses of fluorescent optical radiation, said ultraviolet light source means being located adjacent an end of said predetermined path, photosensitive detector means adjacent said end of said predetermined path having first and second electrode means responsive to said fluorescent optical radiation for providing respective first and second output signals of twice said predetermined frequency, subtractive circuit means for generating a signal representing the difference between said first and second signals, frequency doubler means responsive to said alternating potential supply means, phase sensitive demodulator means responsive to said subtractive circuit means and to said frequency doubler means, and display means adjacent said end of said predetermined path responsive to said phase sensitive demodulator means for providing guidance correction indications to said operator.

4. Apparatus as described in claim 3 wherein said display means comprises:

first indicator means for providing guidance correction indications of a first sense of direction to said operator, and second indicator means for providing guidance correction indications of a second sense of direction to said operator.

5. Apparatus as described in claim 3 further including:

sum circuit means for generating a summation of said first and second output signals, threshold detector means responsive to said sum circuit means for forming an output only when said summation exceeds a predetermined magnitude, and additional display means responsive to said threshold detector means for indicating to said operator when said optically fluorescent surface means is substantially located over said predetermined path.

6. Apparatus as described in claim 5 further including means for inhibiting operation of said display means responsive to said phase sensitive demodulator means when said summation of said first and second signal exceeds said predetermined magnitude.

7. Apparatus as described in claim 5 further including control means for inhibiting operation of said additional display means when one of said first and second signals exceeds a predetermined value.

8. Apparatus for providing guidance indications to the operator of a vehicle with respect to a predetermined path comprising:

alternating potential supply means supplying a potential of a predetermined frequency, optically fluorescent surface means adapted to be mounted on said vehicle, ultraviolet light source means activated by said potential of said predetermined frequency illuminating said optically fluorescent surface means at twice said predetermined frequency for exciting said optically fluorescent surface means to produce at twice said predetermined frequency impulses of fluorescent optical radiation, said ultraviolet light source means being located adjacent an end of said predetermined path, photosensitive detector means adjacent said end of said predetermined path having first and second electrode means responsive to said fluorescent optical radiation for providing respective first and second output signals of twice said predetermined frequency, said photosensitive detector means being mounted on shaft means for angular movement thereabout, subtractive circuit means for generating a signal representing the difference between said first and second signals, frequency doubler means responsive to said alternating potential supply means, phase sensitive demodulator means responsive to said subtractive circuit means and to said frequency doubler means, motive means coupled to said shaft means and responsive to said phase sensitive demodulator means for causing said photosensitive detector means to track said vehicle as it moves along said predetermined path, and display means adjacent said end of said predetermined path responsive to said phase sensitive demodulator means for providing guidance correction indications to said operator.

9. Apparatus as described in claim 8 further including means for providing a separate indication visible to said operator when said vehicle has reached a predetermined point along said predetermined path.

* * * * *